(12) United States Patent
Traina et al.

(10) Patent No.: US 9,485,149 B1
(45) Date of Patent: *Nov. 1, 2016

(54) ROUTING DEVICE HAVING MULTIPLE LOGICAL ROUTERS

(71) Applicant: Juniper Networks, Inc., Sunnyvale, CA (US)

(72) Inventors: Paul S. Traina, Atherton, CA (US); Manoj Leelanivas, Los Gatos, CA (US); Steven Lin, Cupertino, CA (US); Nischal Sheth, Los Altos, CA (US); Wing Eng, Ithaca, NY (US); Andrew H. Heffernan, Belmont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,771

(22) Filed: May 6, 2015

Related U.S. Application Data

(63) Continuation of application No. 10/753,026, filed on Jan. 6, 2004, now Pat. No. 9,032,095.

(51) Int. Cl.
*G06F 15/173* (2006.01)
*H04L 12/24* (2006.01)
*H04L 12/751* (2013.01)

(52) U.S. Cl.
CPC ....... *H04L 41/0893* (2013.01); *H04L 41/0813* (2013.01); *H04L 45/02* (2013.01)

(58) Field of Classification Search
USPC ........ 709/223, 242, 221, 201; 370/389, 400, 370/419, 352, 220.01; 714/4.4, 6.3
See application file for complete search history.

(56) References Cited

U.S. PATENT DOCUMENTS

| 3,962,681 | A | 6/1976 | Requa et al. |
| 4,032,899 | A | 6/1977 | Jenny et al. |
| 4,600,319 | A | 7/1986 | Everett, Jr. |
| 5,375,216 | A | 12/1994 | Moyer et al. |
| 5,408,539 | A | 4/1995 | Finlay et al. |
| 5,490,252 | A | 2/1996 | Macera et al. |
| 5,509,123 | A | 4/1996 | Dobbins et al. |

(Continued)

FOREIGN PATENT DOCUMENTS

| WO | 98/36532 A1 | 8/1998 |
| WO | 02/084920 A2 | 10/2002 |

OTHER PUBLICATIONS

"About Endace," accessed on Apr. 18, 2013, www.endace.com/, 2002, 1 pp.

(Continued)

*Primary Examiner* — Kyung H Shin
(74) *Attorney, Agent, or Firm* — Shumaker & Sieffert, P.A.

(57) ABSTRACT

Techniques are described for implementing one or more logical routers within a single physical routing device. These logical routers, as referred to herein, are logically isolated in the sense that they achieve operational and organizational isolation within the routing device without requiring the use of additional or redundant hardware, e.g., additional hardware-based routing controllers. The routing device may, for example, include a computing platform, and a plurality of software process executing within the computing platform, wherein the software processes operate as logical routers. The routing device may include a forwarding component shared by the logical routers to forward network packets received from a network in accordance with the forwarding tables.

8 Claims, 7 Drawing Sheets

(56) References Cited

U.S. PATENT DOCUMENTS

| | | |
|---|---|---|
| 5,530,958 A | 6/1996 | Agarwal et al. |
| 5,568,471 A | 10/1996 | Hershey et al. |
| 6,011,795 A | 1/2000 | Varghese et al. |
| 6,018,765 A | 1/2000 | Durana et al. |
| 6,148,335 A | 11/2000 | Haggard et al. |
| 6,148,765 A | 11/2000 | Lilleland et al. |
| 6,182,146 B1 | 1/2001 | Graham-Cumming, Jr. |
| 6,226,748 B1 | 5/2001 | Bots et al. |
| 6,321,338 B1 | 11/2001 | Porras et al. |
| 6,392,996 B1 | 5/2002 | Hjalmtysson |
| 6,499,088 B1 | 12/2002 | Wexler et al. |
| 6,501,752 B1 | 12/2002 | Kung et al. |
| 6,563,796 B1 | 5/2003 | Saito |
| 6,584,548 B1 | 6/2003 | Bourne et al. |
| 6,590,898 B1 | 7/2003 | Uzun |
| 6,594,268 B1 | 7/2003 | Aukia et al. |
| 6,598,034 B1 | 7/2003 | Kloth |
| 6,651,098 B1 | 11/2003 | Carroll et al. |
| 6,735,201 B1 | 5/2004 | Mahajan et al. |
| 6,751,663 B1 | 6/2004 | Farrell et al. |
| 6,807,523 B1* | 10/2004 | Wensink ............ H04J 14/0227 703/14 |
| 6,826,713 B1 | 11/2004 | Beesley et al. |
| 6,870,817 B2 | 3/2005 | Dolinar et al. |
| 6,889,181 B2 | 5/2005 | Kerr et al. |
| 6,910,148 B1* | 6/2005 | Ho ............ H04L 45/00 714/4.4 |
| 6,970,943 B1 | 11/2005 | Subramanian et al. |
| 6,973,066 B2 | 12/2005 | Gutowski |
| 6,975,628 B2 | 12/2005 | Johnson et al. |
| 6,983,294 B2 | 1/2006 | Jones et al. |
| 6,985,956 B2 | 1/2006 | Luke et al. |
| 7,031,304 B1 | 4/2006 | Aberg et al. |
| 7,055,174 B1 | 5/2006 | Cope et al. |
| 7,058,974 B1 | 6/2006 | Maher, III et al. |
| 7,099,669 B2 | 8/2006 | Sheffield |
| 7,114,008 B2 | 9/2006 | Jungck et al. |
| 7,117,241 B2* | 10/2006 | Bloch ............ H04Q 3/0025 370/352 |
| 7,120,931 B1 | 10/2006 | Cheriton |
| 7,139,242 B2 | 11/2006 | Bays |
| 7,185,103 B1 | 2/2007 | Jain |
| 7,185,368 B2 | 2/2007 | Copeland, III |
| 7,203,740 B1 | 4/2007 | Putzolo et al. |
| 7,231,459 B2 | 6/2007 | Saraph et al. |
| 7,251,215 B1 | 7/2007 | Turner et al. |
| 7,254,114 B1 | 8/2007 | Turner et al. |
| 7,263,091 B1 | 8/2007 | Woo et al. |
| 7,292,573 B2 | 11/2007 | LaVigne et al. |
| 7,313,100 B1 | 12/2007 | Turner et al. |
| 7,318,179 B1 | 1/2008 | Fernandes |
| 7,362,763 B2 | 4/2008 | Wybenga et al. |
| 7,369,557 B1 | 5/2008 | Sinha |
| 7,376,125 B1 | 5/2008 | Hussain et al. |
| 7,383,541 B1 | 6/2008 | Banks et al. |
| 7,386,108 B1 | 6/2008 | Zave et al. |
| 7,406,030 B1 | 7/2008 | Rijsman |
| 7,420,929 B1 | 9/2008 | Mackie |
| 7,433,966 B2 | 10/2008 | Charny et al. |
| 7,443,805 B1 | 10/2008 | Bynum |
| 7,492,713 B1 | 2/2009 | Turner et al. |
| 7,496,650 B1 | 2/2009 | Previdi et al. |
| 7,496,955 B2 | 2/2009 | Akundi et al. |
| 7,561,569 B2 | 7/2009 | Thiede |
| 7,580,356 B1 | 8/2009 | Mishra et al. |
| 7,606,241 B1 | 10/2009 | Raghunathan et al. |
| 7,630,358 B1 | 12/2009 | Lakhani et al. |
| 7,633,944 B1 | 12/2009 | Chang et al. |
| 7,660,265 B2 | 2/2010 | Kreuk et al. |
| 7,664,855 B1 | 2/2010 | Freed et al. |
| 7,738,396 B1 | 6/2010 | Turner et al. |
| 7,747,737 B1 | 6/2010 | Apte et al. |
| 7,802,000 B1 | 9/2010 | Huang et al. |
| 7,809,827 B1 | 10/2010 | Apte et al. |
| 7,856,014 B2 | 12/2010 | Kreuk |
| 7,869,352 B1 | 1/2011 | Turner et al. |
| 8,031,715 B1 | 10/2011 | Change et al. |
| 8,037,175 B1 | 10/2011 | Apte et al. |
| 8,089,895 B1 | 1/2012 | Mackie |
| 8,340,090 B1 | 12/2012 | Bettink et al. |
| 8,369,345 B1 | 2/2013 | Raghunathan et al. |
| 9,032,095 B1 | 5/2015 | Traina et al. |
| 2002/0095492 A1 | 7/2002 | Kaashoek et al. |
| 2002/0126621 A1 | 9/2002 | Johnson et al. |
| 2002/0141343 A1 | 10/2002 | Bays et al. |
| 2002/0163932 A1 | 11/2002 | Fischer et al. |
| 2003/0005145 A1 | 1/2003 | Bullard |
| 2003/0051048 A1 | 3/2003 | Watson et al. |
| 2003/0097557 A1 | 5/2003 | Tarquini et al. |
| 2003/0105851 A1 | 6/2003 | Metzger et al. |
| 2003/0106067 A1 | 6/2003 | Hoskins et al. |
| 2003/0120769 A1 | 6/2003 | McCollom et al. |
| 2003/0145232 A1 | 7/2003 | Poletto et al. |
| 2003/0165144 A1 | 9/2003 | Wang |
| 2003/0169747 A1 | 9/2003 | Wang |
| 2003/0214913 A1 | 11/2003 | Kan et al. |
| 2003/0223361 A1 | 12/2003 | Hussain et al. |
| 2003/0228147 A1 | 12/2003 | Brahim |
| 2004/0037279 A1 | 2/2004 | Zelig et al. |
| 2004/0059831 A1* | 3/2004 | Chu ............ H04L 41/0893 709/242 |
| 2004/0066782 A1* | 4/2004 | Nassar ............ H04L 12/2856 370/389 |
| 2004/0153573 A1 | 8/2004 | Kim et al. |
| 2004/0165581 A1 | 8/2004 | Oogushi |
| 2004/0186701 A1 | 9/2004 | Aubin et al. |
| 2004/0260834 A1 | 12/2004 | Lindholm et al. |
| 2004/0264465 A1 | 12/2004 | Dunk |
| 2005/0027782 A1 | 2/2005 | Jalan et al. |
| 2005/0041665 A1 | 2/2005 | Weyman et al. |
| 2005/0074009 A1 | 4/2005 | Kanetake et al. |
| 2005/0088965 A1 | 4/2005 | Atlas et al. |
| 2005/0160289 A1 | 7/2005 | Shay |
| 2005/0169281 A1 | 8/2005 | Ko et al. |
| 2005/0190719 A1 | 9/2005 | Lee et al. |
| 2005/0257256 A1 | 11/2005 | Supnik et al. |
| 2005/0265308 A1 | 12/2005 | Barbir et al. |
| 2006/0062206 A1 | 3/2006 | Krishnaswamy |
| 2006/0089994 A1 | 4/2006 | Hayes |
| 2006/0090008 A1 | 4/2006 | Guichard et al. |
| 2006/0153067 A1 | 7/2006 | Vasseur et al. |
| 2006/0168274 A1 | 7/2006 | Aloni et al. |
| 2006/0182122 A1 | 8/2006 | Davie et al. |
| 2006/0203820 A1 | 9/2006 | Coluccio |
| 2006/0268682 A1 | 11/2006 | Vasseur |
| 2006/0268877 A1 | 11/2006 | Gollamudi |
| 2007/0016702 A1 | 1/2007 | Pione et al. |
| 2007/0025241 A1 | 2/2007 | Nadeau et al. |
| 2007/0058558 A1 | 3/2007 | Cheung et al. |
| 2007/0076658 A1 | 4/2007 | Park et al. |
| 2007/0083672 A1 | 4/2007 | Shima et al. |
| 2007/0086448 A1 | 4/2007 | Hu |
| 2007/0091794 A1 | 4/2007 | Filsfils et al. |
| 2007/0115899 A1 | 5/2007 | Ovadia |
| 2007/0121812 A1 | 5/2007 | Strange et al. |
| 2007/0127382 A1 | 6/2007 | Hussain et al. |
| 2007/0140235 A1 | 6/2007 | Aysan et al. |
| 2007/0162783 A1 | 7/2007 | Talaugon et al. |
| 2007/0174685 A1 | 7/2007 | Banks et al. |
| 2007/0291764 A1 | 12/2007 | Wu |
| 2008/0019383 A1 | 1/2008 | Wainwright et al. |
| 2008/0043764 A1 | 2/2008 | Ishizaki et al. |
| 2008/0049664 A1 | 2/2008 | Austin et al. |
| 2008/0069100 A1 | 3/2008 | Weyman et al. |
| 2008/0080508 A1 | 4/2008 | Das et al. |
| 2008/0092229 A1 | 4/2008 | Khanna et al. |
| 2008/0101350 A1 | 5/2008 | Kreuk et al. |
| 2008/0148386 A1 | 6/2008 | Kreuk et al. |
| 2008/0151882 A1 | 6/2008 | Sanjay et al. |
| 2008/0159277 A1 | 7/2008 | Vobbilisetty et al. |
| 2008/0170578 A1 | 7/2008 | Ould-Brahim |
| 2008/0205271 A1 | 8/2008 | Aissaoui et al. |
| 2008/0205395 A1 | 8/2008 | Boddapati et al. |
| 2008/0225852 A1 | 9/2008 | Raszuk et al. |

(56) References Cited

U.S. PATENT DOCUMENTS

| | | |
|---|---|---|
| 2008/0285466 A1 | 11/2008 | Salam et al. |
| 2008/0304476 A1 | 12/2008 | Pirbhai et al. |
| 2008/0310433 A1 | 12/2008 | Retana et al. |
| 2009/0031041 A1 | 1/2009 | Clemmensen |
| 2009/0041038 A1 | 2/2009 | Martini et al. |
| 2009/0092137 A1 | 4/2009 | Haigh et al. |
| 2009/0129385 A1 | 5/2009 | Wray et al. |
| 2009/0175280 A1 | 7/2009 | Berechva et al. |
| 2009/0185506 A1 | 7/2009 | Watson et al. |
| 2010/0046531 A1 | 2/2010 | Louati et al. |
| 2010/0061380 A1 | 3/2010 | Barach et al. |
| 2010/0202295 A1 | 8/2010 | Smith et al. |
| 2010/0214913 A1 | 8/2010 | Kompella |
| 2010/0272110 A1 | 10/2010 | Allan et al. |
| 2010/0309907 A1 | 12/2010 | Proulx et al. |
| 2011/0075664 A1 | 3/2011 | Lambeth et al. |
| 2011/0119748 A1 | 5/2011 | Edwards et al. |

OTHER PUBLICATIONS

"Cisco IOS NetFlow," accessed on Apr. 18, 2013, www.cisco.com/warn/public/732/Tech/nmg/netflow/index.shtml, 2002, 1 pp.

"Sample TCP/IP Packet," accessed on Apr. 4, 2005, www.passwall.com, Version 0.0.0@ 03:55/08.07.2000, Copyright 2002, 6 pp.

"TCP Packet Field Descriptions, updated Jul. 8, 2003," www.ipanalyser.co.uk, Analyser Sales Ltd., Copyright 2003, 2 pp.

"The CAIDA Web Site," accessed on Mar. 4, 2013, www.caida.org/, 2002, 1 pg.

"Well-Known TCP Port Number," accessed on Mar. 3, 2014, www.webopedia.com, 2004, 3 pp.

D.J. Bernstein, "SYN Cookies," http://cr.yp.to/syncookies.html, Oct. 2003, 3 pp.

Dini, P. et al., "Performance Evaluation for Distributed System Components," Proceedings of IEEE Second International Workshop on Systems Management, Jun. 1996, pp. 20-29.

Weaver, A.C. et al., "A Real-Time Monitor for Token Ring Networks," Military Communications Conference, 1989, MILCOM '89, Oct. 1989, vol. 3, pp. 794-798.

Integrated Services Adapter, 2000, Cisco Systems, Data Sheet, accessed on Apr. 18, 2013, http://www.cisco.com/warp/public/cc/pd/ifaa/svaa/iasvaa/prodlit/ism2_ds.pdf, 6 pp.

Jonathan Lemon, accessed on Mar. 4, 2013, "Resisting SYN Flood DoS Attacks with a SYN Cache," http://people.freebsd.org/~jlemon/papers/syncache.pdf, 9 pp.

Juniper Networks, Inc., accessed on Mar. 4, 2013, "Combating Bots and Mitigating DDos Attacks," Juniper Networks, Inc. 2008, http://www.juniper.net/solutions /literature /solutionbriefs/351198.pdf, 8 pp.

Mark Gibbs, "A Guide to Original SYN," www.nwfusion.com, Network World, Nov. 2000, 4 pp.

Michael Egan, "Decomposition of a TCP Packet," www.passwall.com, Aug. 7, 2000, 3 pp.

PCI Technology Overview, Feb. 2003, www.cs.unc.edu/Research/stc/FAQs/pcioverview.pdf, 22 pp.

Stuart Staniford, et al., accessed on Mar. 4, 2013, "Practical Automated Detection of Stealthy Portscans," http://downloads.securityfocus.com/library/spice-ccs2000.pdf, 16 pp.

U.S. Appl. No. 12/897,530, by Manoj Apte, filed Oct. 4, 2010.

U.S. Appl. No. 13/750,926, by Sriram Raghunathan et al., filed Jan. 25, 2013.

Prosecution History from U.S. Appl. No. 10/753,026, dated from Oct. 31, 2008 through Apr. 9, 2015, 201 pp.

\* cited by examiner

ROUTING DEVICE HAVING MULTIPLE LOGICAL ROUTERS

This application is a continuation of U.S. patent application Ser. No. 10/753,026 filed Jan. 6, 2004, the entire contents of which is incorporated herein by reference.

TECHNICAL FIELD

The invention relates to computer networks and, more particularly, to techniques for routing packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

A variety of routers exist within the Internet. Network Service Providers (NSPs), for example, maintain "edge routers" to provide Internet access to the end-users. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

In addition, the NSPs often maintain "service routers" dedicated to providing services to the end-users. Examples of services that the NSP may provide include Voice over IP (VOIP), access for Asynchronous Transfer Mode (ATM) or frame relay communications, Internet protocol (IP) data services, and multimedia services, such as video streaming. NSPs often desire to isolate these services from one another for purposes of reliability. As a result, an NSP may implement each type of service with one or more dedicated service routers.

As Internet-based services become more widely adopted, this use of dedicated service routers leads to increased capital expenditures. Moreover, complexities associated with maintenance and management of separate service routers, edge routers, and core routers can be significant.

SUMMARY

In general, the invention is directed to techniques by which one or more logical routers are implemented within a single physical routing device. These logical routers, as referred to herein, are logically isolated in the sense that they achieve operational and organizational isolation within the routing device without requiring the use of additional or redundant hardware, e.g., additional hardware-based routing controllers. For example, the logical routers may be implemented as isolated software processes having corresponding, i.e., unique, routing tables.

Nevertheless, economies may be achieved by the sharing of certain functions within the routing device. For example, the logically isolated routers may utilize a shared forwarding plane, e.g., a shared forwarding engine and a set of shared interface cards. As another example, the logical routers may share management functions, such as a configuration interface and general configuration data. In this manner, the logical routers achieve a degree of isolation, yet need not necessarily be implemented as fully-duplicative routers having little or no shared functions.

In one embodiment, a routing device comprises a computing platform, and a plurality of software process executing within the computing platform, wherein the software processes operate as logical routers.

In another embodiment, a device comprises a first logical router operating as an access router to provide network access to a set of users, and a second logical router operating as a service router to provide a network service to the end users. The first logical router and the second logical router operate as logically isolated routers within the device.

In another embodiment, a device comprises a first logical router operating as an access router to provide network access to a set of users, and a second logical router operating as a core router to route network traffic from the first logical router to a network backbone. The first logical router and the second logical router operate as logically isolated routers within the device.

In another embodiment, a device comprises a first logical router operating as router within a first one of a pair of redundant networks; and a second logical router operating as a router within a second one of the pair of redundant networks. The first logical router and the second logical router operate as logically isolated routers within the routing device.

In one embodiment, a method comprises executing a plurality of software processes within a routing device, wherein each software process operates as an independent logical router; and forwarding network packets with the logical routers.

In another embodiment, the invention is directed to a computer-readable medium containing instructions. The instructions cause a programmable processor to execute a plurality of software processes within a routing device, wherein each of the software processes operates as an independent logical router, associate each of the logical routers with a respective network, and maintain separate routing tables for the logical routers in accordance with topologies of the respective networks of the logical routers.

The techniques may achieve one or more advantages. For example, implementation of logically isolated routers within a single physical routing device may allow Network Service Providers (NSPs) to collapse portions of network infrastructure into the single routing device that would otherwise require multiple routers. A NSP may, for example, implement multiple service routers as isolated logical routers within the single routing device. As another example, a NSP may implement one or more service routers and one or more edge routers as isolated logical routers within the single routing device. As yet another example, a NSP may implement a combination of edge routers and core routers within the single routing device.

The consolidation of otherwise physically separate routers into a single routing device may lead to increased reliability and service availability. For example, the techniques allow a high-end routing device to implement a core router, and additionally implement one or more logically isolated edge routers or service routers. As a result, the low-end, and possibly less reliable, hardware typically associated with service and edge routers may be eliminated and replaced by logically isolated routers that make use of the resources of the high-end routing device. As another example, co-located routers that are used to provide redundancy, e.g., a primary and a backup router, may be implemented as logical routers within a single routing device without requiring separate hardware for the primary router and the backup router.

The techniques described herein may also lead to increased manageability. The consolidation of otherwise physically separate routers into a single routing device reduces the number of overall routers that need to be separately managed.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
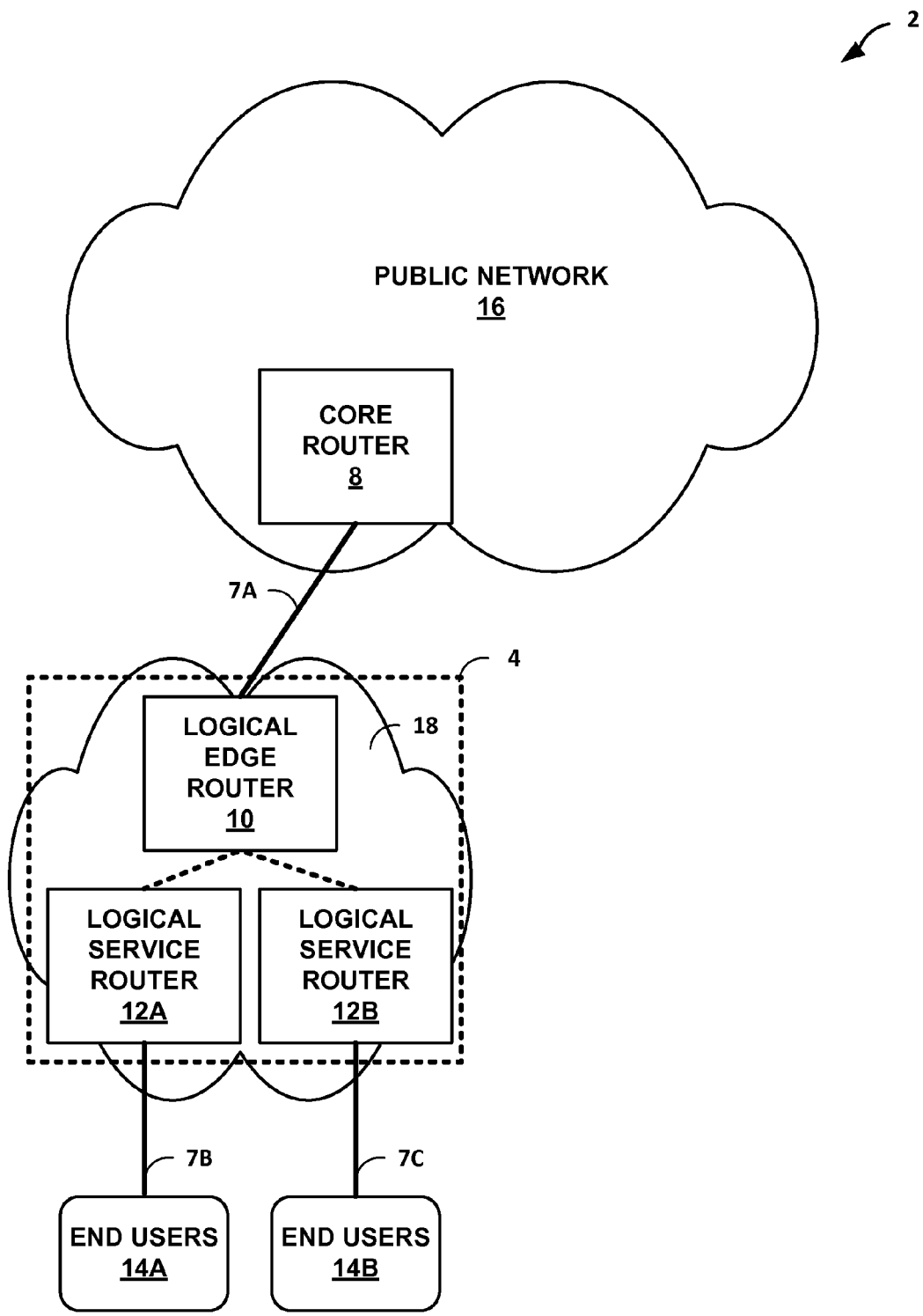
FIG. 1 is a block diagram illustrating a network environment in which a routing device supports multiple logical routers in accordance with the techniques described herein.

FIG. 1 is a block diagram illustrating a network environment 2 in which routing device 4 supports multiple logical routers in accordance with the techniques described herein. Routing device 4 comprises a single, physical device. In other words, routing device 4 includes a single chassis (not shown in FIG. 1), and a set of one or more interface cards (also not shown), for interfacing with network links 7A-7C ("network links 7").

In the exemplary embodiment of FIG. 1, a network service provider (NSP) provides end users 14A and 14B ("end users 14") access to public network 16 via edge network 18. Consistent with the principles of the invention, routing device 4 provides an environment for operation of logical edge router 10 and logical service routers 12A and 12B to form network 18.

Logical edge router 10 communicates network traffic to and from core router 8. In this manner, logical edge router 10 and core router 8 provide connectivity to public network 16, which may be a portion of the Internet. Logical service routers 12A and 12B communicate network traffic to and from logical edge router 10, and provide network services to end users 14. Examples of services that logical service routers 12A and 12B may provide include, for example, Voice over IP (VOIP), access for Asynchronous Transfer Mode (ATM) or frame relay communications, Internet protocol (IP) data services, and multimedia distribution services, such as video streaming. End users 14 access logical service routers 12A and 12B with computing devices or other network-enabled devices, such as cable modems, digital subscriber line (DSL) modems, digital televisions, or other devices.

As described in herein, routing device 4 implements logical edge router 10 and logical service routers 12A and 12B as logically isolated routers without requiring the use of additional or otherwise redundant hardware, e.g., additional hardware-based routing controllers. For example, logical edge router 10 and logical service routers 12A-12B may be implemented as isolated software processes having corresponding, i.e., unique, routing tables. Consequently, in the example of FIG. 1, routing device 4 provides a single physical device that may be used in place of network infrastructure that may otherwise require implementation and management of three physically separate routers.

As illustrated in further detail below, logical edge router 10 and logical service routers 12A and 12B may utilize a shared forwarding plane, e.g., a shared forwarding engine and a set of shared interface cards with which to receive and forward packets via network links 7. In addition, routing device 4 may include a configuration interface for management of logical edge router 10 and logical service routers 12A and 12B. In this manner, logical edge router 10 and logical service routers 12A and 12B provide a degree of isolation, yet need not necessarily be implemented as fully-duplicative routers having little or no sharing of functions.

Figure 2:
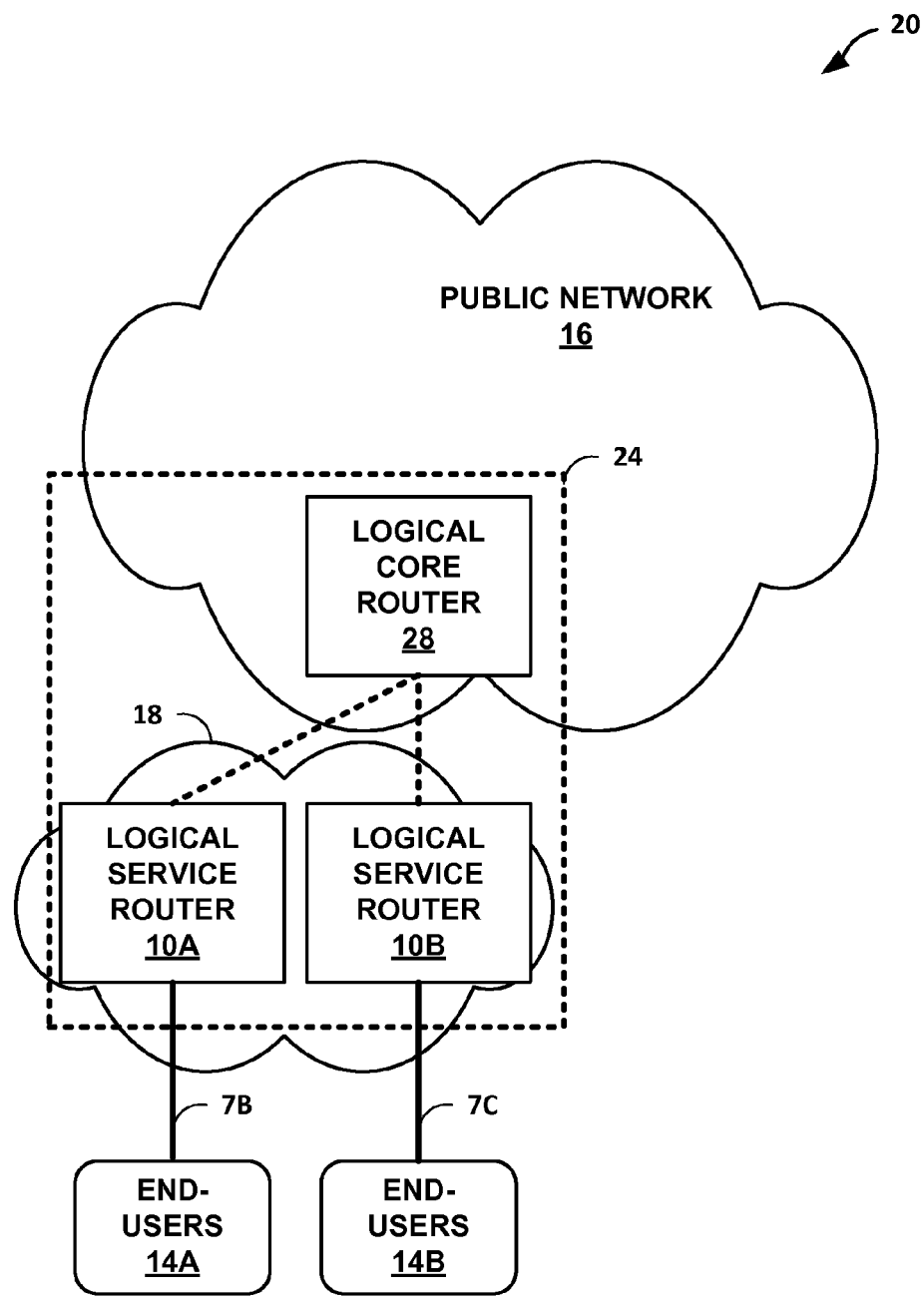
FIG. 2 is a block diagram illustrating a network environment in which a routing device comprises a logical core router and a plurality of logical service routers.

FIG. 2 is a block diagram illustrating a network environment 20 similar to network environment 2 of FIG. 1. Routing device 24 operates substantially similar to routing device 4 of FIG. 1, except that core router 8 (FIG. 1) has been replaced by a logical core router 28 operating within routing device 24. By incorporating logical core router 28, routing device 24 may eliminate the need for logical edge router 10 (FIG. 1). Instead, logical service routers 12A and 12B directly communicate traffic to and from logical core router 28. In the illustrated embodiment, routing device 24 implements logical core router 28 and logical service routers 12A and 12B as logically isolated routers. In this manner, a single routing device, i.e., routing device 24, provides an operating environment for logically isolated routers operating within separate networks, e.g., edge network 18 and public network 16.

Figure 3:
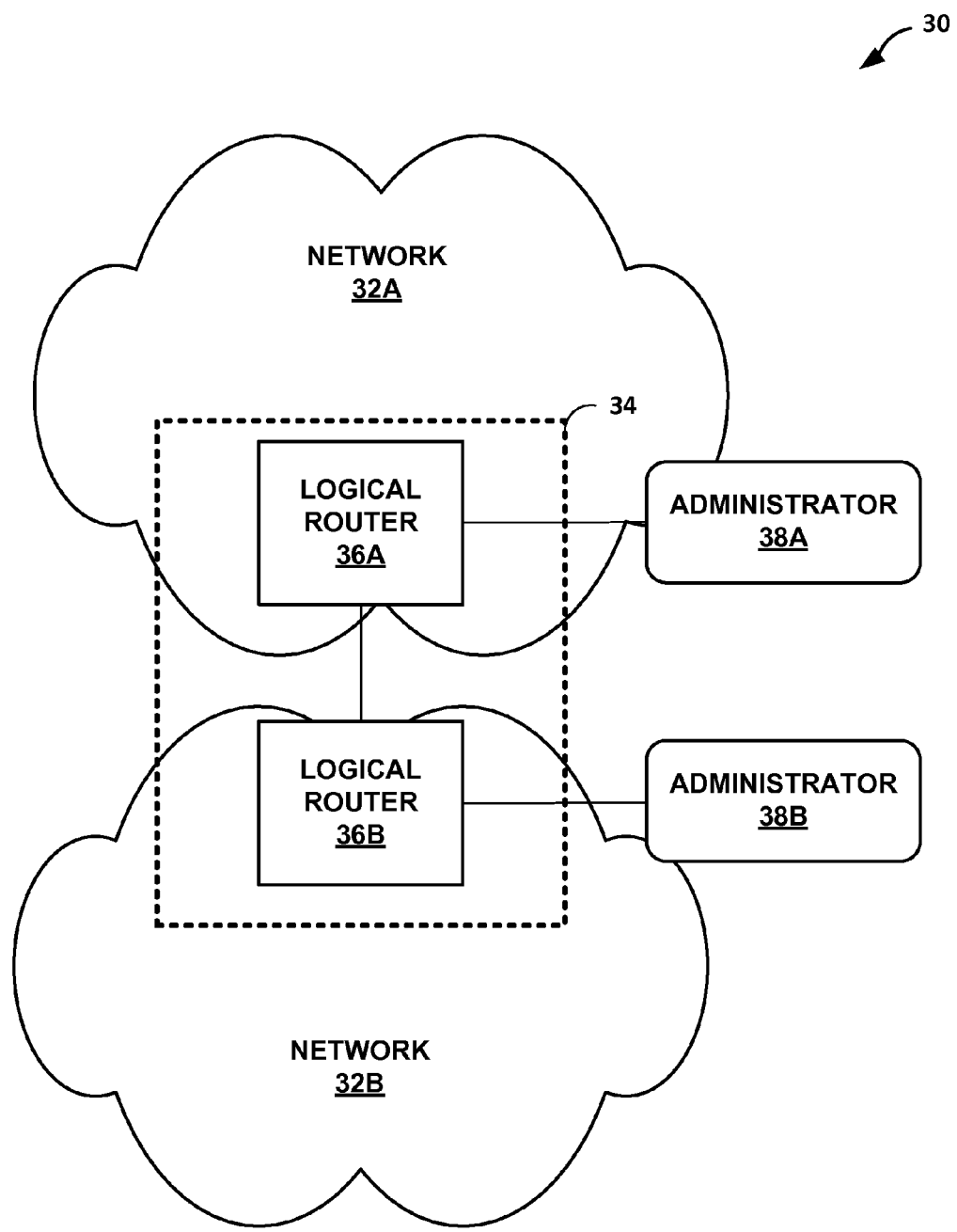
FIG. 3 is a block diagram illustrating a network environment in which a routing device includes a pair of logical routers that provide communication redundancy.

FIG. 3 is a block diagram illustrating a network environment 30 in which networks 32A and 32B provide communication redundancy. In other words, networks 32A and 32B provide parallel connectivity to help ensure communication, and may be maintained and operated by separate organizations. In this embodiment, routing device 34 includes logical routers 36A and 36B that provide logical, organizational and operational separation of routing functions. Consequently, a single routing device, i.e., routing device 34, achieves logically isolated routers within separate networks 32A and 32B, eliminating the need for separate physical devices. Moreover, although routers 36A and 36B operate within a common device, i.e., routing device 34, the logical isolation allows system administrators 38A and 38B to independently manage and separately configure logical routers 36A and 36B, respectively.

Figure 4:
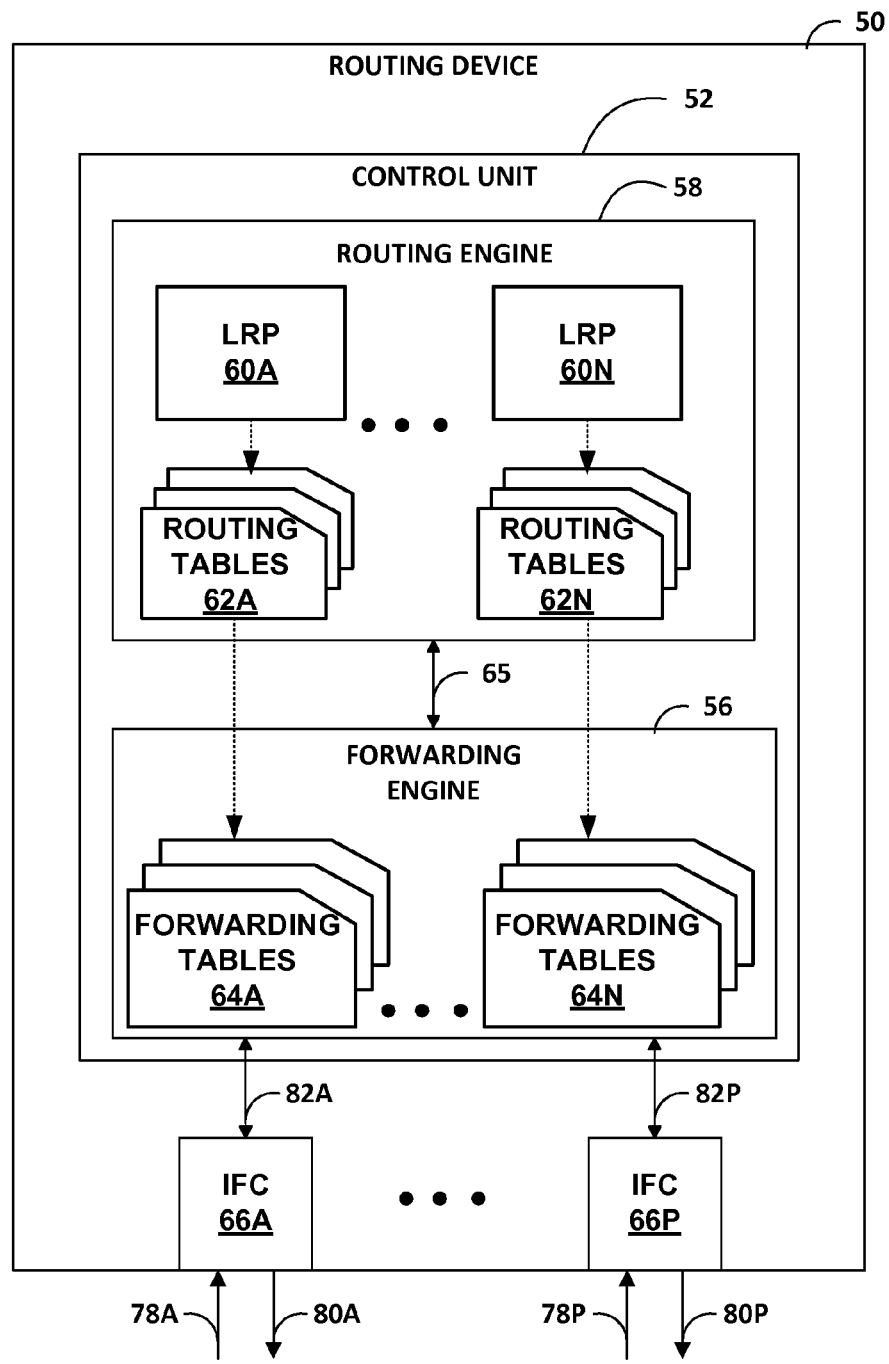
FIG. 4 is a block diagram illustrating an example embodiment of a routing device that may support one or more logical routers consistent with the principles of the invention.

FIG. 4 is a block diagram illustrating an example embodiment of routing device 50 that may support one or more logical routers consistent with the principles of the invention. For exemplary purposes, routing device 50 is illustrated as including a control unit 52 in which functionality is generally divided between a routing engine 58 and a forwarding engine 56.

Routing engine 58 provides an operating environment for one or more logical router processes (LRPs) 60A-60N. LRPs 60A-60N ("LRPs 60") operate as independent routers that are operationally and organizationally isolated within routing device 50. Each of LRPs 60 is primarily responsible for maintaining one or more corresponding routing tables 62A-62N based on routes learned from other routers. More specifically, LRPs 60 support routing protocols by which LRPs 60 exchange routing information with other routers. The other routers may be external to routing device 50. In addition, LRPs 60 view each other as separate routers, and interact with each other in a manner similar to their interaction with external routers. For example, as described in further detail below, LRPs 60 may be configured to forward packets to each other as separate routers. Similarly, LRPs 60 may exchange routing information with each other in a manner similar to physically separate routers. Exemplary routing interior and exterior routing protocols that may be supported by LRPs 60 include the Border Gateway Protocol (BGP), the Intermediate System to Intermediate System (ISIS) protocol, the Open Shortest Path First (OSPF) protocol, and the Routing Information Protocol (RIP).

Routing device 50 further includes interface cards 66A-66P ("IFCs 66") that receive and send packet flows via network links 78A-78P ("network links 78") and 80A-80P ("network links 80"), respectively. IFCs 66 are typically coupled to network links 78, 80 via a number of interface ports (not shown), and forward and receive packets and control information to and from forwarding engine 56 via a respective one of interfaces 82A-82P ("interfaces 82"). Routing device 50 may include a chassis (not shown) having a number of slots for receiving a set of cards, including IFCs 66. Each card may be inserted into a corresponding slot of the chassis for electrically coupling the card to control unit 52 via a bus, backplane, switch fabric or other electrical communication mechanism.

Each of LRPs 60 perform route resolution to independently generate one or more corresponding forwarding tables 64A-64N ("forwarding tables 64") in accordance with their respective routing tables 62A-62N ("routing tables 62"). Each of forwarding tables 64 associate destination information, such as IP address prefixes, with specific forwarding next hops (FNHs) and corresponding interface IFCs 66. Forwarding tables 64 may, therefore, be thought of as based on the information contained within the respective routing tables 62. In response to topology changes, one or more of LRPs 60 may update respective tables of routing tables 62, and generates corresponding forwarding tables 64 based on the affected routes.

Each of LRPs 60 communicates its respective forwarding tables 64 to forwarding engine 56 via data communication channel 65 for use in forwarding network packets. Although described for exemplary purposes in reference to tables, LRPs 60 and forwarding engine 56 may maintain routing tables 62 and forwarding tables 64 in the form of one or more tables, databases, link lists, radix trees, databases, flat files, combinations thereof, or any other data structures.

In operation, routing device 50 receives inbound packets from network links 78, determines destinations for the received packets, and outputs the packets on network links 80 based on the destination information within the packets. More specifically, upon receiving an inbound packet via one of inbound links 78, a respective one of IFCs 66 relays the packet to forwarding engine 56. In response, forwarding engine 56 reads data from the packet, referred to as the "key," that may include, for example, a network destination for the packet. The key may, for example, also contain a routing prefix for another router within the network. Based on the key, forwarding engine 56 directs the inbound packet to an appropriate one or more of IFCs 66 for transmission in accordance with forwarding tables 64.

In one embodiment, routing engine 58 comprises one or more programmable processors executing an operating system (not shown). The operating system may provide a multi-tasking operating environment for execution of LRPs 60 as independent software processes. For example, as independent software processes, the operating system may maintain respective process state for each of LRPs 60, such as a program data and stack, program counter, stack pointer, register values, address space, and other process information. As a result, each of LRPs 60 is logically isolated from each other, and software bugs and other problems that may arise in one of the LRPs may not negatively impact the other LRPs. Other software processes (not shown) may be implemented, such as a device configuration process that controls the physical configuration of router 50, and a user interface (UI) process that provides an interface by which a remote system administrator or script can control and configure routing device 50. An example of such an operating system is FreeBSD, which is an advanced UNIX operating system that is compatible with a number of programmable processors, including processors from INTEL CORPORATION™.

LRPs 60 and the other software processes may be stored as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Forwarding engine 56 may comprise one or more dedicated processors, discrete hardware circuitry, firmware, and/or specialized hardware. Data communication channel 65 may be a high-speed network connection, bus, switch fabric, shared-memory or other data communication mechanism.

Figure 5:
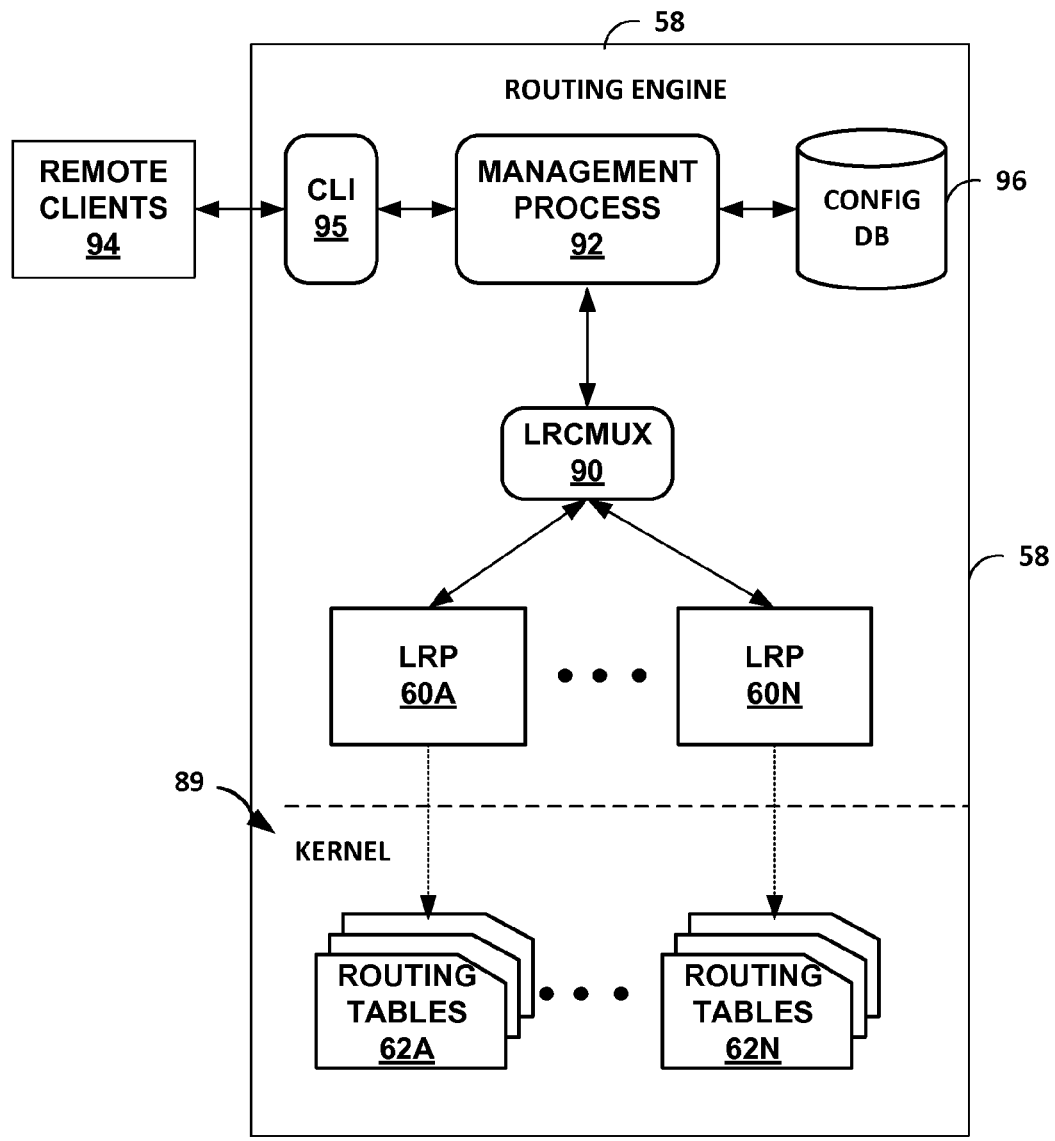
FIG. 5 is a block diagram illustrating an exemplary embodiment of a routing engine of the routing device of FIG. 4.

FIG. 5 is a block diagram illustrating an exemplary embodiment of routing engine 58 (FIG. 4) in further detail. In the illustrated embodiment, routing engine 58 includes kernel 89, i.e., an operating system, that stores and maintains routing tables 62 under the direction of LRPs 60. As illustrated, LRPs 60 operate as software processes for which kernel 89 maintains separate and independent process state.

Routing engine 58 further includes a command line interface (CLI) 95 for processing user or script-driven commands. Remote clients 94 may, for example, interact with CLI 95 to provide configuration commands and data to routing engine 58, as well as receive status information from the routing engine. Management process 92 processes the configuration commands and data received from CLI 95, and stores the configuration commands and data in configuration database (CONFIG DB) 96. Configuration database 96 may take the form of a text file, such as an ASCII file, one or more databases, tables, data structures, or the like.

Remote clients 94 may comprise human system administrators or software agents that provide configuration scripts. Moreover, although illustrated for exemplary purposes with reference to remote clients 94, a user may directly interact with CLI 95, e.g., via a keyboard or other input device directly coupled to routing device 50.

Management process 92 directs the received configuration commands and data to logical router command multiplexer (LRCMUX) 90, e.g., a software multiplexer, which distributes the configuration commands and data to the appropriate LRPs 60 based on a login "context" associated with each of remote clients 94. In other words, the login context for each of remote clients 94 determines the scope of access afforded the remote client. For example, any of clients 94 associated with a "master login" context has system-wide access to the configuration and operation of the physical routing device 50. Consequently, clients 94 associated with a master login context are able to configure the physical components of routing device 50, and access software modules and other resources residing on the routing device. In addition, clients 94 associated with the master login may configure a "default" logical routing process, e.g., LRP 60A, which operates within routing device 50 regardless of whether any additional LRPs are configured to operate.

In contrast, a "logical router" (LR) login context allows clients 94 limited access to configure particular LRPs 60. In this manner, remote clients 94 associated with an LR login context may independently configure respective ones of LRPs 60. For example, a remote client 94 associated with an LR login context may independently adjust parameters for supported network protocols and modify the routing information maintained by a respective one of LRPs 60. However, that remote client is prevented from accessing and configuring other LRPs 60, or other processes or resources within routing device 50.

To maintain and enforce these requirements, LRCMUX 90 associates each CLI session presented by CLI 95 with a respective one of LRPs 60. Upon receiving a configuration command from management process 92, LRCMUX 90 directs the command to the appropriate one of LRPs 60, i.e., the one of LRPs 60 that is associated with the CLI session from which the command was received. LRCMUX 90 may, for example, maintain respective communication sockets for each of LRPs 60 for communicating the commands to the appropriate one of the LRPs.

In one embodiment, CLI 95 and management process 92 support a command syntax that allows those clients 94 associated with a master login context to designate which of LRPs 60 their current CLI sessions are to be bound. In particular, the set cli command may be used in accordance with the following syntax:

set cli <logical router name> to bind a current CLI session to a particular one of LRPs 60. In this manner, clients 94 having master login access rights are able to change the context of their current CLI sessions to different LRPs 60, thereby controlling the configuration data presented via CLI 95 in response to a show command.

In one embodiment, management process 92 supports a text-based configuration syntax for defining LRPs 60 as follow:

logical-routers {
  <logical-router-name> {
    /*..*/
  }
  <logical-router-name> {
    /*..*/
  }
  .
  .
  .
  <logical-router-name> {
    /*..*/
  }
}

In the above example, the keyword logical-routers is used to initiate a stanza of configuration text in which one or more logical routers, e.g., LRPs 60, is defined and configured. The syntax allows each of LRPs 60 to be identified by a unique string name, and allows interfaces, protocols, policy options, routing instances, and routing options to be separately defined for each of the LRPs, as illustrated by the following exemplary syntax.

<logical-router-name> {
  routing instances <routing-instance-name> {
    /*...*/
  }
  routing options{
    /*...*/
  }
  protocols{
    /*...*/
  }
  policy-options{
    /*...*/
  }
  interfaces{
    <ifd-name> {
      unit <unit-number>
    }
  }
}

In the above exemplary syntax, each of the routing instances, routing options, protocols, policy-options and interfaces associated with the logical router can be configured with a corresponding stanza of text. The interface stanza is used to associate a logical interface with the logical router being defined. More specifically, one or more remote clients 94 associated with a master login context may create a number of logical interfaces associated with the physical interfaces presented by IFCs 66 (FIG. 4). In accordance with the command syntax described above, each of the logical interfaces is bound to a respective one of LRPs 60. In other words, each logical interface is bound to a single one of LRPs 60, and each of the LRPs may be bound to multiple logical interfaces.

Management process 92 may verify compliance with this requirement of a one-to-one relationship between LRPs 60 and logical interfaces when the configuration data is committed, i.e., presented via remote clients 94 for acceptance as operational configuration data. More specifically, management process 92 may process commit and rollback commands so that the commands are exclusive to the particular LR contexts associated with remote clients 94. In general, commit commands are used to indicate to management process 92 that candidate configuration data is to be processed and used as operational data, while rollback commands are used to indicate that candidate configuration data is to be discarded. When such a command is received, management process 92 and LRCMUX 90 limit the affect of the commands to the portions of configuration database 96 corresponding to the one of LRPs 60 that is associated with the CLI session from which the command was received. In other words, in response to a commit command received from a CLI session, management process 92 commits only those portions of candidate configuration for the one of LRPs 60 associated with that CLI session. Management process 92 handles rollback commands in similar fashion.

In one embodiment, management process 92 supports a command syntax in which a keyword contains-node may be used within a logical router stanza to indicate that a corresponding configuration object is copied, or aliased, from another location within the configuration data. For example, the contains-node keyword may be used to easily replicate the entire routing-instance and protocols hierarchies within the definition of a logical router as follows:

```
logical-routers VOIP-service-router {
    routing instances VOIP-service {
        contains-node "main-routing-instances"
    }
    protocols{
        contains-node "main-routing-protocols"
    }
}
```

In this example, it is assumed that configuration data associated with the main-routing-instances and main-routing-protocols have been defined elsewhere, such as in association with the default one of LRPs 60.

Figure 6:
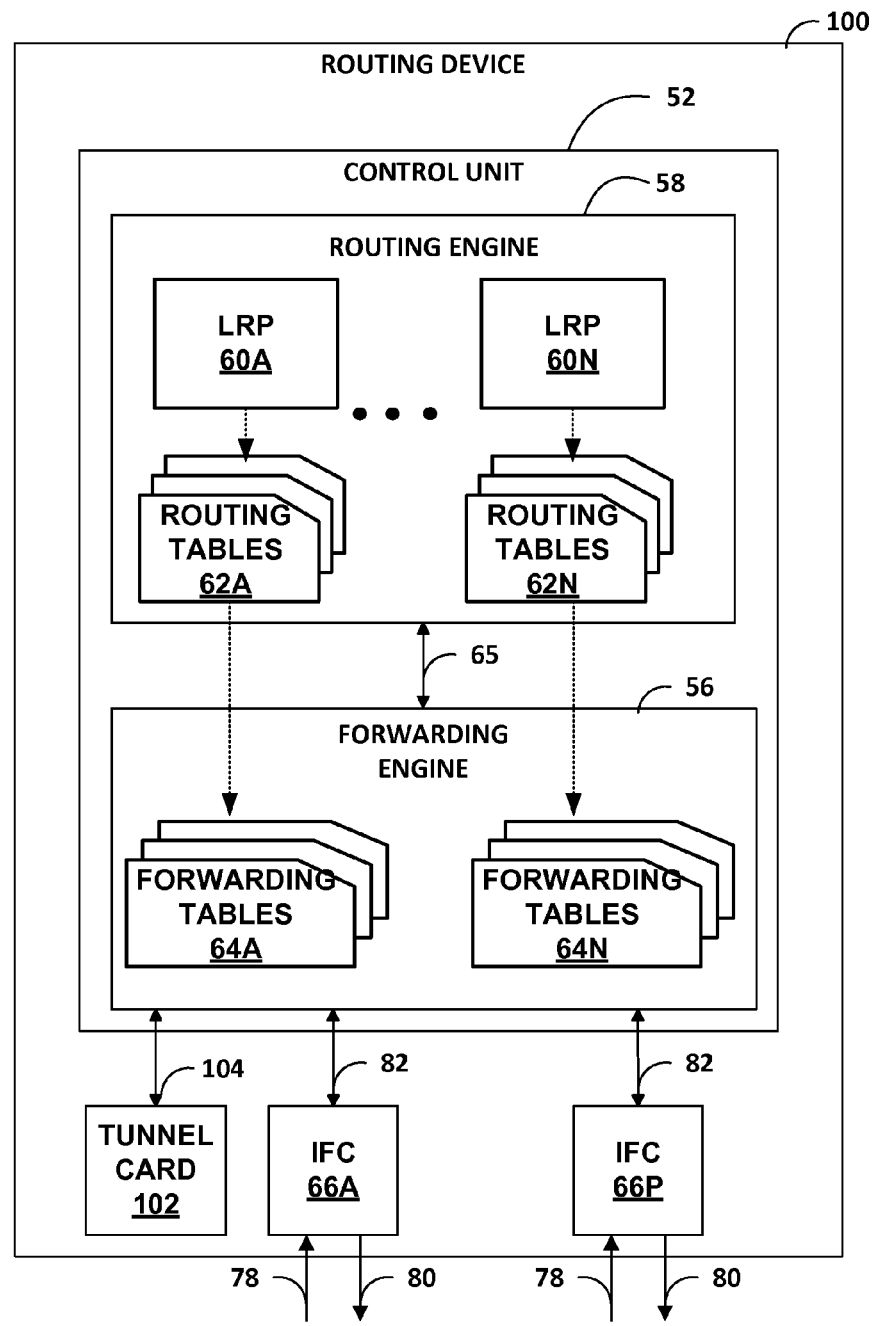
FIG. 6 illustrates another exemplary embodiment of a routing device that supports logical routers.

FIG. 6 illustrates another exemplary embodiment of a routing device 100 that supports logically isolated routers. Routing device 100 operates substantially similar to routing device 50 (FIG. 4), but incorporates tunnel card 102. Tunnel card 102 represents an additional card that may be inserted within a chassis of routing device 100, and provides for forwarding and routing of packets between LRPs 60.

More specifically, tunnel card 102 is a shared resource that may be used by any of LRPs 60, and may be viewed by the LRPs as a destination within a network. In other words, LRPs 60 may configure their respective forwarding tables 64A-64N to forward packets to tunnel card 102 via interface 104 as if tunnel card 102 was an external network destination. Upon receipt of packets from forwarding engine 56, tunnel card 102 redirects the packets to forwarding engine 56 for additional forwarding. In this manner, LRPs 60 may forward packets to each other and maintain packet isolation as if they were on separate networks.

LRP 60A, for example, may configure forwarding tables 64A to designate tunnel card 102 as a next hop for packets destined to LRP 60N. Upon receiving a packet via a logical interface associated with forwarding table 64A, tunnel card 102 provides a data path for returning the packet to forwarding engine 56. For example, tunnel card 102 may return the packet to forwarding engine 56 via a logical interface associated with forwarding table 64N. Forwarding engine 56 then forwards the packet in accordance to forwarding table 64, e.g., to an external router via one of IFCs 66 or to another one of LRPs 60 via tunnel card 102. In this manner, tunnel card 102 acts as a destination, i.e., next hop, to which packets may be directed by LRPs 60 for forwarding to other LRPs 60.

In one embodiment, the command syntax presented by management interface 92 (FIG. 5) allows remote clients 94 to designate point-to-point peer relationships between LRPs 60 in order to utilize tunnel card 102. For example, remote clients 94 may provide configuration data for a logical router, as illustrated with the following pseudocode, to establish a peering relationship between two logical interfaces that have been previously associated with respective LRPs 60.

```
logical-routers {
    lr1 {
        interfaces {
            lt-4/2/0 {
                unit 1 {
                    peer-unit 21; /* Peering with lr2 */
                    encapsulation frame-relay;
                    ...
                }
            }
        }
    }
    lr2 {
        interfaces {
            lt-4/2/0 {
                unit 2 {
                    peer-unit 12; /* Peering with lr1 */
                    encapsulation frame-relay-ccc;
                    ...
                }
            }
        }
    }
}
```

In the above example, two logical routers lr1 and lr2 are defined. For each logical router a respective logical tunnel interface ("lt") is defined as lt-4/2/0. This logical tunnel interface is bound to logical interfaces unit 1 and unit 0, which are identified as peer logical interfaces. This allows the LRPs 60 to which the logical interfaces are assigned, i.e., logical routers lr1 and lr2 in this example, to exchange packets via tunnel card 102 and forwarding engine 56 as if they were physically separate routers.

In addition to providing a data path for forwarding packets between LRPs 60, tunnel card 102 may provide shared resources for processing the packets. For example, tunnel card 102 may provide encryption/decryption and encapsulation/de-capsulation services for LRPs 60. Consequently, LRPs 60 may utilize tunnel card 102 to form logical network tunnels between logical tunnel interfaces associated with pairs of the LRPs.

Although described for exemplary purposes in reference to tunnel card 102, other mechanisms may be implemented for LRPs 60 to forward packets to each other. For example, forwarding engine 56 may be configured to automatically apply a "double-lookup" to forward packets between LRPs 60, thereby avoiding the use of tunnel card 102. Upon receiving a packet associated with one of LRPs 60, forwarding engine 56 applies a first lookup in accordance with the respective tables of forwarding tables 64 to determine a destination for the packet. If the destination is another one of LRPs 60, forwarding engine 56 may automatically apply a second lookup in accordance with the tables associated with the destination LRP to determine the subsequent destination. This process may be repeated a plurality of times in the event a packet is forwarded through two or more LRPs 60.

Figure 7:
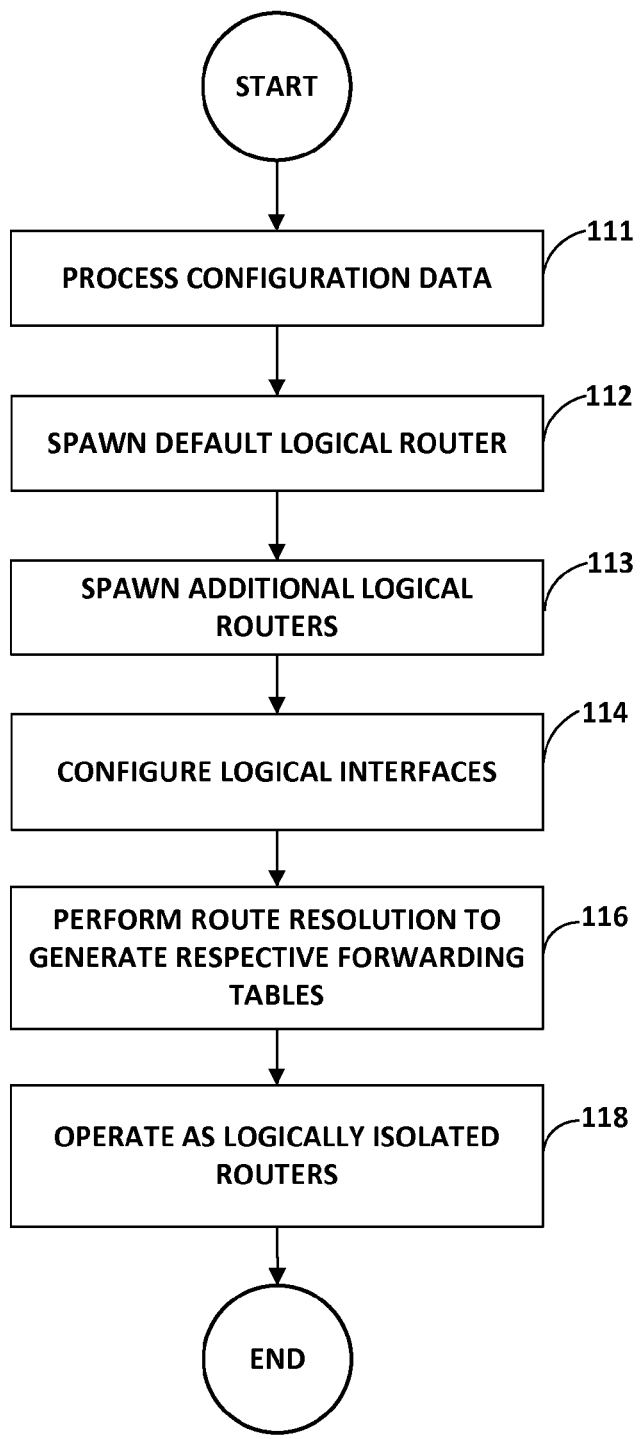
FIG. 7 is a flow chart illustrating an example operation of a routing device in supporting logical routers.

FIG. 7 is a flow chart illustrating an example operation of a routing device, e.g., routing device 100 of FIG. 6, in accordance with the principles of the invention. In general, control unit 52 processes operational configuration data (111) and, in accordance with the operational configuration data, spawns a default logical router (112) and optionally one or more additional logical routers (113).

Based on the configuration data, the logical routers are configured in accordance with the specified routing protocols, interfaces, policies, routing instances (114). Once spawned, the logical routers independently perform route resolution to generate their respective forwarding tables (116), and operate as logically isolated routers (118).

Various embodiments of the invention have been described. These and other embodiments are within the scope of the following claims.

The invention claimed is:

1. A device comprising:
 one or more programmable processors configured to execute a plurality of software processes, wherein the plurality of software processes operate as logical routers, wherein the logical routers include a first logical router and a second logical router;
 a management process having a command line interface to receive commands from a plurality of clients by respective configuration sessions over a network, wherein the command line interface of the management process supports a text-based command syntax that allows each of the plurality of clients to specify a command to designate one of the logical routers for configuration using the respective configuration session; and
 a software multiplexer to receive the commands from the management process and to distribute the commands to at least one of the first logical router and the second logical router in accordance with the designation by the clients.

2. The device of claim 1, wherein each of the logical routers is associated with a respective network, and the logical routers maintain separate routing tables in accordance with topologies of their respective networks.

3. The device of claim 1, wherein each of the logical routers performs route resolution to generate separate forwarding tables in accordance with the separate routing tables.

4. The device of claim 3, further comprising a forwarding component shared by the logical routers to forward network packets received from a network in accordance with the forwarding tables.

5. The device of claim 1,
 wherein the management process associates a login context with each of the configuration sessions based on privileges for the client configuring associated with the configuration session, and
 wherein the management process controls access to the logical routers based upon the login contexts associated with each of the plurality of configuration sessions.

6. The device of claim 5,
 responsive to determining that, in accordance with the login context, a client associated with one of the configuration session has system-wide access privileges, the management process allows the client to configure any of the logical routers using the respective configuration session.

7. The device of claim 5, responsive to determining that, in accordance with the login context, a client associated with one of the configuration sessions has limited access privileges, the management process allows the client to configure only a corresponding one of the logical routers and prevents the client from configuring any of the other logical routers using the respective configuration session.

8. The device of claim 1,
 wherein the command syntax defines a set command having an attribute for uniquely designating the logical router that is to be configured by the respective configuration session, and
 wherein in response to receiving the set command from one of the clients over one of the plurality of configuration sessions, the management process binds the configuration session for that client to the logical router identified by the command for controlling distribution of the commands from that client to the identified logical router by the software multiplexer.

* * * * *